United States Patent
Park et al.

(10) Patent No.: US 12,319,761 B2
(45) Date of Patent: *Jun. 3, 2025

(54) OLEFIN-BASED POLYMER

(71) Applicant: LG Chem, Ltd., Seoul (KR)

(72) Inventors: In Sung Park, Daejeon (KR); Ji Yoon Woo, Daejeon (KR); Sang Eun Park, Daejeon (KR); Ki Eun Kim, Daejeon (KR); Sang Wook Han, Daejeon (KR)

(73) Assignee: LG Chem, Ltd., Seoul (KR)

( * ) Notice: Subject to any disclaimer, the term of this patent is extended or adjusted under 35 U.S.C. 154(b) by 695 days.

This patent is subject to a terminal disclaimer.

(21) Appl. No.: 17/762,930

(22) PCT Filed: Jul. 2, 2021

(86) PCT No.: PCT/KR2021/008450
§ 371 (c)(1),
(2) Date: Mar. 23, 2022

(87) PCT Pub. No.: WO2022/005257
PCT Pub. Date: Jan. 6, 2022

(65) Prior Publication Data
US 2022/0403073 A1 Dec. 22, 2022

(30) Foreign Application Priority Data
Jul. 3, 2020 (KR) .................. 10-2020-0082135

(51) Int. Cl.
*C08F 210/16* (2006.01)
*C08F 2/01* (2006.01)
(Continued)

(52) U.S. Cl.
CPC .............. *C08F 210/16* (2013.01); *C08F 2/01* (2013.01); *C08F 2/04* (2013.01); *C08F 4/6592* (2013.01)

(58) Field of Classification Search
CPC .. C08F 210/16; C08F 2/01; C08F 2/04; C08F 4/6592; C08F 4/65908; C08F 2420/02; C08F 210/08; C08F 2500/12
See application file for complete search history.

(56) References Cited

U.S. PATENT DOCUMENTS

| 6,284,701 | B1 | 9/2001 | Yoon et al. |
| 2007/0225158 | A1 | 9/2007 | Lee et al. |

(Continued)

FOREIGN PATENT DOCUMENTS

| CN | 104703994 A | 6/2015 |
| CN | 113795525 A | 12/2021 |

(Continued)

OTHER PUBLICATIONS

Search report from International Application No. PCT/KR2021/008450, mailed Oct. 12, 2021.

(Continued)

*Primary Examiner* — Catherine S Branch
(74) *Attorney, Agent, or Firm* — Lerner David LLP (57) ABSTRACT

The present invention relates to an olefin-based polymer satisfying requirements: (1) a melt index (MI, 190° C., 2.16 kg load conditions) ranging from 1.0 to 10.0 g/10 min; (2) a density (d) ranging from 0.875 to 0.895 g/cc; (3) 0.5 J/g≤dH(100)≤3.0 J/g and 1.0 J/g≤dH(90)≤6.0 J/g as measured by successive self-nucleation/annealing (SSA) using a differential scanning calorimeter (DSC); (4) 15≤T(90)−T(50)≤30 and 50° C.≤T(50)≤75° C. as measured by SSA using a DSC; and (5) a melting point (Tm) of 55° C.≤Tm≤80° C. as measured using a DSC. The olefin-based polymer according to the present invention is a low-density olefin-based polymer and has a highly crystalline region introduced therein, thereby exhibiting high mechanical stiffness.

16 Claims, 1 Drawing Sheet

(51) Int. Cl.
*C08F 2/04* (2006.01)
*C08F 4/6592* (2006.01)
*C08F 210/08* (2006.01)

(56) References Cited

U.S. PATENT DOCUMENTS

| | | |
|---|---|---|
| 2010/0062927 A1 | 3/2010 | Lee et al. |
| 2011/0152529 A1 | 6/2011 | Lee et al. |
| 2011/0160413 A1 | 6/2011 | Lee et al. |
| 2011/0172451 A1 | 7/2011 | Lee et al. |
| 2011/0177935 A1 | 7/2011 | Lee et al. |
| 2013/0085246 A1 | 4/2013 | Kum et al. |
| 2015/0017365 A1 | 1/2015 | Sohn et al. |
| 2015/0094435 A1 | 4/2015 | Cho et al. |
| 2016/0046735 A1 | 2/2016 | Lee et al. |
| 2016/0272743 A1 | 9/2016 | Park et al. |
| 2016/0347874 A1 | 12/2016 | Boller et al. |
| 2017/0312951 A1 | 11/2017 | Kawamura |
| 2018/0223014 A1 | 8/2018 | Woo et al. |
| 2019/0211122 A1 | 7/2019 | Lee et al. |
| 2020/0362073 A1 | 11/2020 | Park et al. |
| 2021/0009793 A1 | 1/2021 | Lee et al. |
| 2022/0325018 A1 | 10/2022 | Park et al. |

FOREIGN PATENT DOCUMENTS

| | | |
|---|---|---|
| EP | 3950740 A1 | 2/2022 |
| JP | 2008527050 A | 7/2008 |
| JP | 2010514836 A | 5/2010 |
| JP | 2013533351 A | 8/2013 |
| JP | 2019031097 A | 2/2019 |
| KR | 100288272 B1 | 5/2001 |
| KR | 20070003071 A | 1/2007 |
| KR | 20070096465 A | 10/2007 |
| KR | 20130111042 A | 10/2013 |
| KR | 20150034592 A | 4/2015 |
| KR | 20160124788 A | 10/2016 |
| KR | 20170067642 A | 6/2017 |
| KR | 20180051223 A | 5/2018 |
| KR | 20190076499 A | 7/2019 |
| KR | 20190076899 A | 7/2019 |
| KR | 20210038235 A | 4/2021 |
| WO | 2019125050 A1 | 6/2019 |
| WO | 2019132475 A1 | 7/2019 |

OTHER PUBLICATIONS

Extended European Search Report for Application No. 21832313.7 dated Nov. 7, 2022. 9 pgs.

OLEFIN-BASED POLYMER

CROSS-REFERENCE TO RELATED APPLICATION

The present application is a national stage entry under U.S.C. § 371 of International Application No. PCT/KR2021/008450 filed on Jul. 2, 2021, which claims priority from Korean Patent Applications No. 10-2020-0082135 filed on Jul. 3, 2020, all the disclosures of which are incorporated herein by reference.

TECHNICAL FIELD

The present invention relates to an olefin-based polymer, and specifically, to a low-density olefin-based polymer which has a highly crystalline region introduced therein and thus exhibits high mechanical stiffness.

BACKGROUND ART

Polyolefins are widely used for extrusion-molded articles, blow-molded articles and injection-molded articles due to excellent moldability, heat resistance, mechanical properties, hygienic quality, water vapor permeability and appearance characteristics of molded articles thereof. However, polyolefins, particularly polyethylene, have a problem of low compatibility with polar resins such as nylon because of the absence of polar groups in the molecule, and low adhesiveness to polar resins and metals. As a result, it is difficult to blend the polyolefin with polar resins or metals or to laminate the polyolefin with these materials. Further, molded articles made of polyolefins have a problem of low surface hydrophilicity and a low antistatic property.

In order to solve the above problems and to increase the affinity for a polar material, a method of grafting a polar group-containing monomer onto a polyolefin through radical polymerization has been widely used. However, this method has a problem in that cross-linking in the molecules of the polyolefin and cleavage of molecular chains occur during the grafting reaction, and thus the viscosity balance of a graft polymer and a polar resin is poor, leading to low miscibility. There is also a problem in that the appearance characteristics of a molded article are poor due to a gel component generated by intramolecular crosslinking or a foreign substance generated by cleavage of molecular chains.

Further, as a method of preparing an olefin polymer such as an ethylene homopolymer, an ethylene/α-olefin copolymer, a propylene homopolymer, or a propylene/α-olefin copolymer, a method of copolymerizing a polar monomer in the presence of a metal catalyst such as a titanium catalyst or a vanadium catalyst was used. However, when the above-described metal catalyst is used to copolymerize a polar monomer, there is a problem in that the molecular weight distribution or composition distribution is wide, and polymerization activity is low.

As another method, a method of performing polymerization in the presence of a metallocene catalyst including a transition metal compound such as zirconocene dichloride and an organoaluminum oxy compound (aluminoxane) is known. When the metallocene catalyst is used, a high-molecular weight olefin polymer is obtained with high activity, and the resulting olefin polymer has a narrow molecular weight distribution and a narrow composition distribution.

Further, as a method of preparing a polyolefin containing a polar group using, as a catalyst, a metallocene compound having a ligand of a non-crosslinked cyclopentadienyl group, a crosslinked or non-crosslinked bisindenyl group, or an ethylene crosslinked unsubstituted indenyl/fluorenyl group, a method using a metallocene catalyst is also known. However, these methods have a disadvantage in that polymerization activity is very low. For this reason, a method of protecting a polar group by a protecting group is performed, but there is a problem in that the process becomes complicated because the protecting group needs to be removed again after the reaction when used.

An ansa-metallocene compound is an organometallic compound containing two ligands connected to each other by a bridge group, in which the rotation of the ligand is prevented and the activity and structure of the metal center are determined by the bridge group.

The ansa-metallocene compound has been used as a catalyst in the preparation of olefin-based homopolymers or copolymers. In particular, it is known that an ansa-metallocene compound containing a cyclopentadienyl-fluorenyl ligand is able to be used to prepare a high-molecular weight polyethylene, thereby controlling the microstructure of the polypropylene.

Further, it is also known that an ansa-metallocene compound containing an indenyl ligand is able to be used to prepare a polyolefin having excellent activity and improved stereoregularity.

As described above, various studies have been made on ansa-metallocene compounds capable of controlling the microstructure of olefin-based polymers while having higher activity, but the studies are still insufficient.

DISCLOSURE OF THE INVENTION

Technical Problem

The present invention is directed to providing a low-density olefin-based polymer which is obtained by polymerizing olefin-based monomers while inputting hydrogen gas using a transition metal compound catalyst and has a highly crystalline region introduced therein, thereby exhibiting high mechanical stiffness.

Technical Solution

One aspect of the present invention provides an olefin-based polymer satisfying the following requirements (1) to (5):

a melt index (MI, 190° C. and 2.16 kg load conditions) ranging from 0.1 to 10.0 g/10 min;

a density (d) ranging from 0.875 to 0.895 g/cc;

$0.5$ J/g$\leq$dH(100)$\leq$3.0 J/g and 1.0 J/g$\leq$dH(90)$\leq$6.0 J/g as measured by successive self-nucleation/annealing (SSA) using a differential scanning calorimeter (DSC);

$15 \leq T(90)-T(50) \leq 30$ and $50°$ C.$\leq T(50) \leq 75°$ C. as measured by SSA using a DSC; and a melting point (Tm) of $55°$ C.$\leq$Tm$\leq 80°$ C. as measured using a DSC, wherein the T(50) and T(90) represent temperatures at which 50% and 90% are melted, respectively, when a temperature-heat capacity curve in the result of SSA measurement using a DSC is fractionated, dH(90) represents the enthalpy of fusion at 90° C. or more, and dH(100) represents the enthalpy of fusion at 100° C. or more.

Advantageous Effects

An olefin-based polymer according to the present invention is a low-density olefin-based polymer and has a highly crystalline region introduced therein, thereby exhibiting high mechanical stiffness.

BEST MODE FOR CARRYING OUT THE INVENTION

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

In the specification, the term "polymer" refers to a polymer compound prepared by polymerizing the same type or different types of monomers. The generic term "polymer" encompasses an "interpolymer" as well as a "homopolymer", a "copolymer", and a "terpolymer". In addition, the "interpolymer" refers to a polymer prepared by polymerizing at least two different types of monomers. The generic term "interpolymer" encompasses not only a "copolymer" (typically used for denoting a polymer prepared from two different types of monomers) but also a "terpolymer" (typically used for denoting a polymer prepared from three different types of monomers). Also, the interpolymer encompasses a polymer prepared by polymerizing at least four different types of monomers.

An olefin-based polymer according to the present invention satisfies the following requirements (1) to (5):

a melt index (MI, 190° C. and 2.16 kg load conditions) ranging from 0.1 to 10.0 g/10 min; (2) a density (d) ranging from 0.875 to 0.895 g/cc; (3) 0.5 J/g≤dH(100) ≤3.0 J/g and 1.0 J/g≤dH(90)≤6.0 J/g as measured by successive self-nucleation/annealing (SSA) using a differential scanning calorimeter (DSC); (4) 15≤T(90)−T (50)≤30 and 50° C.≤T(50)≤75°) C. as measured by SSA using a DSC; and (5) a melting point (Tm) of 55° C.≤Tm≤80° C. as measured using a DSC.

T(50) and T(90) represent temperatures at which 50% and 90% are melted, respectively, when a temperature-heat capacity curve in the result of SSA measurement using a DSC is fractionated, dH(90) represents the enthalpy of fusion at 90° C. or more, and dH(100) represents the enthalpy of fusion at 100° C. or more.

When the olefin-based polymer according to the present invention exhibits low density and has a highly crystalline region introduced therein, thereby having the same levels of density and a melt index (MI, 190° C., 2.16 kg load conditions) as those of a conventional olefin-based polymer, higher tensile strength, flexural modulus, and hardness are exhibited. The olefin-based polymer according to the present invention is prepared by a method including polymerizing olefin-based monomers while inputting hydrogen gas in the presence of a catalyst composition for olefin polymerization, and a highly crystalline region is introduced by the input of hydrogen gas in the polymerization, thereby exhibiting excellent mechanical stiffness.

The melt index (MI) may be adjusted by adjusting the amount of the catalyst used in the polymerization of the olefin-based polymer with respect to the comonomer and affects the mechanical properties, impact strength, and moldability of the olefin-based polymer. In the specification, the melt index is measured at 190° C. under a load of 2.16 kg at a low density of 0.875 g/cc to 0.895 g/cc in accordance with ASTM D1238 and may range from 0.1 g/10 min to 10 g/10 min, specifically 0.3 g/10 min to 9 g/10 min, and more specifically 0.4 g/10 min to 7 g/10 min.

Meanwhile, the density may range from 0.875 g/cc to 0.895 g/cc, specifically 0.876 g/cc to 0.892 g/cc, and more specifically 0.878 g/cc to 0.891 g/cc.

The density of a conventional olefin-based polymer is affected by the type and amount of monomer used in polymerization, the degree of polymerization, and the like. In the case of a copolymer, it is greatly affected by the amount of a comonomer. The olefin-based polymer of the present invention is polymerized using a catalyst composition including a transition metal compound with a specific structure and allows the introduction of a large amount of comonomer. Therefore, the olefin-based polymer of the present invention may have low density within the above-described range.

In addition, the olefin-based polymer may satisfy the requirement (3) of 0.5 J/g≤dH(100)≤3.0 J/g and 1.0 J/g≤dH (90)≤6.0 J/g, specifically 0.9 J/g≤dH(100)≤2.0 J/g and 1.5 J/g≤dH(90)≤5.0 J/g, and more specifically 0.95 J/g≤dH(100) ≤1.9 J/g and 1.6 J/g≤dH(90)≤4.5 J/g, as measured by successive self-nucleation/annealing (SSA) using a differential scanning calorimeter (DSC).

Additionally, the olefin-based polymer may satisfy the requirement (4) of 15≤T(90)−T(50)≤30 and 50° C.≤T(50) ≤75°) C., specifically 16≤T(90)−T(50)≤25 and 52° C.≤T(50) ≤74° C., and more specifically 17T(90)−T(50)≤25 and 54° C.≤T(50)≤73° C., as measured by SSA using a DSC.

In addition, the olefin-based polymer may satisfy the requirement (5) of a melting point (Tm) of 55° C.≤Tm≤80° C., specifically 60° C.≤Tm≤80° C., and more specifically 65° C.≤Tm≤75° C., as measured by a DSC.

Additionally, the olefin-based polymer may further satisfy a requirement (6) of a glass transition temperature (Tg) of −70° C.≤Tg≤−43° C., specifically −60° C.≤Tg≤−43° C., and more specifically −51° C.≤Tg≤−43° C., as measured by a DSC.

In general, a melting temperature (Tm) is measured using a differential scanning calorimeter (DSC) by performing heating to a temperature about 30° C. higher than a melting temperature (Tm) at a constant rate and cooling to a temperature about 30° C. lower than a glass transition temperature (Tg) at a constant rate (the first cycle) and then obtaining a peak for a standard melting temperature (Tm) in the second cycle. The successive self-nucleation/annealing (SSA) using a DSC is a method capable of obtaining more precise crystal information by performing a process of heating to a temperature close to a melting temperature (Tm) and cooling after the first cycle using a DSC and repeatedly performing a process of heating to an about 5° C. lower temperature and cooling (Eur. Polym. J. 2015, 65, 132).

When a small amount of a highly crystalline region is introduced to the olefin-based polymer, it is not obtained by general melting temperature measurement using a DSC, and high-temperature melt peaks may be measured by the SSA using a DSC.

In addition, the olefin-based polymer according to an embodiment of the present invention may further satisfy a requirement (7) of a weight-average molecular weight (Mw) ranging from 10,000 g/mol to 500,000 g/mol, specifically 30,000 g/mol to 300,000 g/mol, and more specifically 50,000 g/mol to 200,000 g/mol. In the present invention, the weight-average molecular weight (Mw) is a polystyrene-converted molecular weight analyzed by gel permeation chromatography (GPC).

In addition, the olefin-based polymer according to an embodiment of the present invention may further satisfy a requirement (8) of a molecular weight distribution (MWD), which is a ratio (Mw/Mn) of a weight-average molecular weight (Mw) and a number-average molecular weight (Mn), ranging from 0.1 to 6.0, and the molecular weight distribution (MWD) may specifically range from 1.0 to 4.0, and more specifically, 2.0 to 3.0.

In addition, the olefin-based polymer according to an embodiment of the present invention may further satisfy a requirement (9) of a melt flow rate ratio (MFRR), ranging from 5 to 10, and the melt flow rate ratio (MFRR) may specifically range from 6 to 9, and more specifically, 6 to 8.

The melt flow rate ratio (MFRR) refers to a ratio obtained by dividing $MI_{10}$ (melt index under a load of 10 kg and 190° C.) by $MI_{2.16}$ (melt index under a load of 2.16 kg and 190° C.). As the number of the long chain branches (LCBs) of a polymer decreases, the MFRR may be lowered, and the mechanical properties of the polymer may be improved.

The olefin-based polymer is a homopolymer of any one or a copolymer of two or more selected from among olefin-based monomers, specifically, an α-olefin-based monomer, a cyclic olefin-based monomer, a diene olefin-based monomer, a triene olefin-based monomer, and a styrene-based monomer. More specifically, the olefin-based polymer may be a copolymer of ethylene and a C3 to C12 α-olefin or C3 to 010 α-olefin comonomer.

The α-olefin comonomer may include any one or a mixture of two or more selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbornene, phenyl norbornene, vinyl norbornene, dicyclopentadiene, 1,4-butadiene, 1,5-pentadiene, 1,6-hexadiene, styrene, α-methylstyrene, divinylbenzene, and 3-chloromethyl styrene.

More specifically, the olefin copolymer according to an embodiment of the present invention may be a copolymer of ethylene and propylene, ethylene and 1-butene, ethylene and 1-hexene, ethylene and 4-methyl-1-pentene, or ethylene and 1-octene. Even more specifically, the olefin copolymer according to an embodiment of the present invention may be a copolymer of ethylene and 1-butene.

When the olefin-based polymer is a copolymer of ethylene and an α-olefin, the amount of the α-olefin may be 90 wt % or less, specifically 70 wt % or less, more specifically 5 wt % to 60 wt %, and even more specifically 10 wt % to 50 wt % with respect to the total weight of the copolymer. When the α-olefin is included in the above-described range, the above-described physical properties can be appropriately achieved.

The olefin-based polymer according to an embodiment of the present invention, which has the above-described physical properties and constitutional characteristics, may be prepared by a continuous solution polymerization reaction in which olefin-based monomers are polymerized while inputting hydrogen gas in the presence of a metallocene catalyst composition including at least one type of a transition metal compound in a single reactor. Accordingly, in the olefin-based polymer according to an embodiment of the present invention, a block formed by linearly connecting two or more repeating units derived from one monomer among monomers constituting a polymer in the polymer is not formed. That is, the olefin-based polymer according to the present invention does not include a block copolymer and may be selected from the group consisting of a random copolymer, an alternating copolymer, and a graft copolymer, and more specifically, may be a random copolymer.

Specifically, the olefin-based polymer of the present invention may be prepared by a preparation method including polymerizing olefin-based monomers while inputting hydrogen gas in the presence of a catalyst composition for olefin polymerization including a transition metal compound represented by the following Chemical Formula 1, for example, by a continuous solution polymerization reaction using a continuous stirred tank reactor while inputting hydrogen in the presence of a catalyst composition for olefin polymerization including a transition metal compound represented by the following Chemical Formula 1.

However, in the preparation of the olefin-based polymer according to an embodiment of the present invention, the structural range of a transition metal compound represented by the following Chemical Formula 1 is not limited to specifically disclosed types, and all modifications, equivalents, or replacements included in the scope and technical range of the present invention should be understood to be included in the present invention.

[Chemical Formula 1]

In Chemical Formula 1, $R_1$ is the same as or different from each other and each independently represents hydrogen, a C1 to C20 alkyl, a C2 to C20 alkenyl, aryl, silyl, alkylaryl, arylalkyl, or a metalloid radical of a Group 4 metal substituted with a hydrocarbyl, and the two $R_1$ may be connected to each other by an alkylidine radical including a C1 to C20 alkyl or a C6 to C20 aryl radical to form a ring;

$R_2$ is the same as or different from each other and each independently represents hydrogen; a halogen; a C1 to C20 alkyl; aryl; alkoxy; aryl oxy; or an amido radical, and two or more of $R_2$ may be connected to each other to form an aliphatic ring or an aromatic ring;

$R_3$ is the same as or different from each other and each independently represents hydrogen; a halogen; a C1 to C20 alkyl; or an aryl radical-substituted or unsubstituted nitrogen-containing aliphatic or aromatic ring, and when there are a plurality of the substituents, two or more substituents may be connected to each other to form an aliphatic ring or an aromatic ring;

M is a Group 4 transition metal; and $Q_1$ and $Q_2$ each independently represent a halogen; a 01 to C20 alkyl; alkenyl; aryl; alkylaryl; arylalkyl; a C1 to C20 alkyl amido; or aryl amido.

In addition, according to another embodiment of the present invention, in Chemical Formula 1, $R_1$ and $R_2$ are the same as or different from each other and may each independently represent hydrogen; a C1 to C20 alkyl; aryl; or silyl, $Q_1$ and $Q_2$ are the same as or different from each other and may each independently represent a halogen; a C1 to C20 alkyl; or a C1 to C20 alkylamido; or arylamido, and M may be a Group 4 transition metal.

Further, in the transition metal compound represented by Chemical Formula 1, a metal site is connected by a cyclopentadienyl ligand to which tetrahydroquinoline is introduced, and the structure thereof has a narrow Cp-M-N angle and a wide $Q_1$-M-$Q_2$ angle to which a monomer approaches. In addition, Cp, tetrahydroquinoline, nitrogen, and the metal site are connected in order via the bonding of a ring shape to form a more stable and rigid pentagonal ring structure. Therefore, when these compounds are activated by reacting with a cocatalyst such as methylaluminoxane or $B(C_6F_5)_3$ and then applied to olefin polymerization, an olefin-based polymer having characteristics such as high activity, high molecular weight, high copolymerization properties, and the like may be polymerized even at a high polymerization temperature.

According to an embodiment of the present invention, the input amount of hydrogen gas may range from 0.00005 to 0.001 parts by weight, specifically 0.00008 to 0.0008 parts by weight, and more specifically 0.0001 to 0.0005 parts by weight with respect to 1 part by weight of the olefin-based monomer input into a reaction system. Also, according to an embodiment of the present invention, when the olefin-based polymer is polymerized by continuous solution polymerization, the hydrogen gas may be input in an amount of 16 to 35 cc/min, specifically 18 to 31 cc/min, and more specifically 18 to 29 cc/min with respect to 1 kg/h of then olefin-based monomer input into a reaction system.

In addition, according to another embodiment of the present invention, when the olefin-based polymer is a copolymer of ethylene and an α-olefin, the hydrogen gas may be input in an amount of 0.00007 to 0.0008 parts by weight, specifically 0.0008 to 0.0007 parts by weight, and more specifically 0.0001 to 0.0004 parts by weight with respect to 1 part by weight of ethylene. Also, according to an embodiment of the present invention, when the olefin-based polymer is a copolymer of ethylene and an α-olefin and is polymerized by continuous solution polymerization, the hydrogen gas may be input in an amount of 22 to 46 cc/min, specifically 25 to 44 cc/min, and more specifically 25 to 40 cc/min with respect to 1 kg/h of ethylene input into a reaction system.

Additionally, the amount of hydrogen gas input in the polymerization of the olefin-based monomer may range from 20 to 40 sccm, specifically 22 to 38 sccm, and more specifically 22 to 35 sccm. The input amount of hydrogen gas is based on a case where 0.87 kg/h of ethylene is input into a reaction system. When the input amount of hydrogen gas satisfies the above-described range in the presence of a catalyst composition for olefin polymerization including the transition metal compound represented by Chemical Formula 1, an olefin-based polymer satisfying the requirements for the physical properties of the olefin-based polymer according to an embodiment of the present invention can be prepared.

Each of the substituents defined in the present specification will be described in detail as follows.

As used herein, the term "hydrocarbyl group", unless otherwise specified, refers to a C1 to C20 monovalent hydrocarbon group formed only with carbon and hydrogen, regardless of its structure, such as an alkyl group, an aryl group, an alkenyl group, an alkynyl group, a cycloalkyl group, an alkylaryl group, an arylalkyl group, and the like.

As used herein, the term "halogen", unless otherwise specified, refers to fluorine, chlorine, bromine, or iodine.

As used herein, the term "alkyl", unless otherwise specified, refers to a linear or branched hydrocarbon residue.

As used herein, the term "cycloalkyl", unless otherwise specified, refers to cyclic alkyl such as cyclopropyl and the like.

As used herein, the term "alkenyl", unless otherwise specified, refers to a linear or branched alkenyl group.

The branched chain may be a 01 to C20 alkyl; a C2 to C20 alkenyl; a C6 to C20 aryl; a C7 to C20 alkylaryl; or a C7 to C20 arylalkyl.

As used herein, the term "aryl", unless otherwise specified, refers to a C6 to C20 aromatic group, and specific examples thereof include phenyl, naphthyl, anthryl, phenanthryl, chrysenyl, pyrenyl, anthracenyl, pyridyl, dimethylanilinyl, anisolyl, and the like, but the present invention is not limited thereto.

The alkylaryl group refers to an aryl group substituted with an alkyl group.

The arylalkyl group refers to an alkyl group substituted with an aryl group.

The ring (or a heterocyclic group) refers to a monovalent aliphatic or aromatic hydrocarbon group which has a ring atom with 5 to 20 carbon atoms and may contain one or more heteroatoms, and may be a single ring or a condensed ring of two or more rings. Also, the heterocyclic group may be unsubstituted or substituted with an alkyl group. Examples thereof include indoline, tetrahydroquinoline, and the like, but the present invention is not limited thereto.

The alkylamino group refers to an amino group substituted with an alkyl group, and examples thereof includes a dimethylamino group, a diethylamino group, and the like, but the present invention is not limited thereto.

According to an embodiment of the present invention, the aryl group preferably has 6 to 20 carbon atoms, and specific examples thereof include phenyl, naphthyl, anthracenyl, pyridyl, dimethylanilinyl, anisolyl, and the like, but the present invention is not limited thereto.

As used herein, silyl may be a 01 to C20 alkyl-substituted or unsubstituted silyl, and examples thereof include silyl, trimethylsilyl, triethylsilyl, tripropylsilyl, tributylsilyl, trihexylsilyl, triisopropylsilyl, triisobutylsilyl, triethoxysilyl, triphenylsilyl, tris(trimethylsilyl)silyl, and the like, but the present invention is not limited thereto.

The compound represented by Chemical Formula 1 may be a compound represented by the following Chemical Formula 1-1, but the present invention is not limited thereto.

[Chemical Formula 1-1]

In addition, the compound represented by Chemical Formula 1 may be a compound with various structures within the range defined in Chemical Formula 1.

The transition metal compound represented by Chemical Formula 1 allows the introduction of not only low-density polyethylene but also a large amount of α-olefin due to the structural characteristics of the catalyst, and thus it is possible to prepare a low-density polyolefin copolymer having a density of 0.850 g/cc to 0.890 g/cc.

For example, the transition metal compound represented by Chemical Formula 1 may be prepared as follows.

[Reaction Scheme 1]

In Reaction Scheme 1, $R_1$ to $R_3$, M, $Q_1$, and $Q_2$ are as defined in Chemical Formula 1.

Chemical Formula 1 may be prepared by the method disclosed in Korean Patent Publication No. 2007-0003071, the disclosure of which is incorporated herein by reference in its entirety.

The transition metal compound represented by Chemical Formula 1 may also be used as a catalyst for a polymerization reaction in the form of a composition further including one or more types of cocatalyst compounds represented by the following Chemical Formulas 2, 3, and 4.

$$-[Al(R_4)-O]_a-  \quad \text{[Chemical Formula 2]}$$

$$A(R_4)_3 \quad \text{[Chemical Formula 3]}$$

$$[L-H]^+[W(D)_4]^- \text{ or } [L]^+[W(D)_4]^- \quad \text{[Chemical Formula 4]}$$

In Chemical Formulas 2 to 4, $R_4$ may be the same as or different from each other and each independently selected from the group consisting of a halogen, a C1 to C20 hydrocarbyl, and a C1 to C20 hydrocarbyl substituted with a halogen, A is aluminum or boron, D is each independently a C6 to C20 aryl or a C1 to C20 alkyl in which at least one hydrogen atom may be substituted with a substituent, and the substituent is at least one selected from the group consisting of a halogen, a C1 to C20 hydrocarbyl, a C1 to C20 alkoxy, and a C6 to C20 aryloxy, H is a hydrogen atom, L is a neutral or cationic Lewis base, W is a Group 13 element, and a is an integer of 2 or more.

Examples of the compound represented by Chemical Formula 2 include alkylaluminoxanes such as methylaluminoxane (MAO), ethylaluminoxane, isobutylaluminoxane, butylaluminoxane, and the like, and modified alkylaluminoxanes having two or more of the alkylaluminoxanes mixed therein, and the compound may specifically be methyl aluminoxane or modified methyl aluminoxane (MAO).

Examples of the compound represented by Chemical Formula 3 include trimethylaluminum, triethylaluminum, triisobutylaluminum, tripropylaluminum, tributylaluminum, dimethylchloroaluminum, tri-iso-propyl aluminum, tri-sec-butyl aluminum, tricyclopentyl aluminum, tripentyl aluminum, triisopentyl aluminum, trihexyl aluminum, trioctyl aluminum, ethyldimethyl aluminum, methyldiethyl aluminum, triphenyl aluminum, tri-p-tolyl aluminum, dimethyl aluminum methoxide, dimethyl aluminum ethoxide, trimethyl boron, triethyl boron, triisobutyl boron, tripropyl boron, tributyl boron, and the like, and the compound may be specifically selected from among trimethyl aluminum, triethyl aluminum, and triisobutyl aluminum.

Examples of the compound represented by Chemical Formula 4 include triethylammonium tetraphenylboron, tributylammonium tetraphenylboron, trimethylammonium tetraphenylboron, tripropylammonium tetraphenylboron, trimethylammonium tetra(p-tolyl) boron, trimethylammonium tetra(o,p-dimethylphenyl) boron, tributylammonium tetra(p-trifluoromethylphenyl) boron, trimethylammonium tetra(p-trifluoromethylphenyl) boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, dimethylanilinium tetrakis(pentafluorophenyl) borate, triethylammonium tetraphenyl aluminum, tributylammonium tetraphenyl aluminum, trimethylammonium tetraphenyl aluminum, tripropylammonium tetraphenyl aluminum, trimethylammonium tetra(p-tolyl) aluminum, tripropylammonium tetra(p-tolyl) aluminum, triethylammoniumtetra (o,p-dimethylphenyl) aluminum, tributylammonium tetra(p-trifluoromethylphenyl) aluminum, trimethylammonium tetra(p-trifluoromethylphenyl) aluminum, tributylammonium tetrapentafluorophenyl aluminum, N,N-diethylanilinium tetraphenyl aluminum, N,N-diethylanilinium tetrapentafluorophenyl aluminum, diethylammonium tetrapentatetraphenyl aluminum, triphenylphosphonium tetraphenyl aluminum, trimethylphosphonium tetraphenyl aluminum, tripropylammonium tetra(p-tolyl) boron, triethylammonium tetra(o,p-dimethylphenyl) boron, triphenylcarbonium tetra(p-trifluoromethylphenyl) boron, triphenylcarbonium tetrapentafluorophenylboron, and the like.

The catalyst composition may be prepared by a method including 1) bringing a transition metal compound represented by Chemical Formula 1 into contact with a compound represented by Chemical Formula 2 or 3 to obtain a mixture; and 2) adding a compound represented by Chemical Formula 4 to the mixture, as the first method.

In addition, the catalyst composition may be prepared by a method of bringing a transition metal compound represented by Chemical Formula 1 into contact with a compound represented by Chemical Formula 4, as the second method.

In the first method among the above-described preparation methods of the catalyst composition, the molar ratio of the transition metal compound represented by Chemical Formula 1 and the transition metal compound represented by Chemical Formula 2/the compound represented by Chemical Formula 2 or 3 may be 1/5,000 to 1/2, specifically 1/1,000 to 1/10, and more specifically 1/500 to 1/20. When the molar ratio of the transition metal compound represented by Chemical Formula 1/the compound represented by Chemical Formula 2 or 3 exceeds 1/2, the amount of an alkylating agent is very small, and thus the alkylation of a metal compound is not fully performed. When the molar ratio is less than 1/5000, the alkylation of a metal compound is performed, but the activation of the alkylated metal compound is not fully achieved due to the side reaction between the remaining excess alkylating agent and an activating agent which is a compound represented by Chemical Formula 4. Also, the molar ratio of the transition metal compound represented by Chemical Formula 1/the compound represented by Chemical Formula 4 may be 1/25 to 1, specifically 1/10 to 1, and more specifically 1/5 to 1. When the molar ratio of the transition metal compound represented by Chemical Formula 1/the compound represented by Chemical Formula 4 exceeds 1, the amount of an activator is relatively small, so that a metal compound is not fully activated, and thus the activity of the resulting catalyst composition may be degraded. When the molar ratio is less than 1/25, the activation of a metal compound is fully performed, but the unit cost of the catalyst composition may not be economical due to the remaining excess activator, or the purity of the produced polymer may be degraded.

In the second method among the above-described preparation methods of the catalyst composition, the molar ratio of the transition metal compound represented by Chemical Formula 1/the compound represented by Chemical Formula 4 may be 1/10,000 to 1/10, specifically 1/5,000 to 1/100, and more specifically 1/3,000 to 1/500. When the molar ratio exceeds 1/10, the amount of an activator is relatively small, so that the activation of a metal compound is not fully achieved, and thus the activity of the resulting catalyst composition may be degraded. When the molar ratio is less than 1/10,000, the activation of a metal compound is fully performed, but the unit cost of the catalyst composition may not be economical due to the remaining excess activator, or the purity of the produced polymer may be degraded.

In the preparation of the catalyst composition, a hydrocarbon-based solvent such as pentane, hexane, heptane, or the like, or an aromatic solvent such as benzene, toluene, or the like may be used as a reaction solvent.

In addition, the catalyst composition may include the transition metal compound and a cocatalyst compound in the form of being supported on a carrier.

The carrier may be used without any particular limitation as long as it is used as a carrier in a metallocene catalyst. Specifically, the carrier may be silica, silica-alumina, silica-magnesia, or the like, and any one or a mixture of two or more thereof may be used.

Particularly, when the carrier is silica, there is almost no catalyst liberated from the surface during the olefin polymerization process because the silica carrier and the functional groups of the metallocene compound of Chemical Formula 1 form a chemical bond. As a result, it is possible to prevent the occurrence of fouling of the wall surface of the reactor or the polymer particles clumping together during the preparation process of the olefin-based polymer. Also, an olefin-based polymer prepared in the presence of the catalyst including the silica carrier has an excellent particle shape and apparent density of the polymer.

More specifically, the carrier may be high-temperature dried silica or silica-alumina containing a siloxane group having high reactivity on the surface through a method such as high-temperature drying.

The carrier may further include an oxide, carbonate, sulfate, or nitrate component such as $Na_2O$, $K_2CO_3$, $BaSO_4$, $Mg(NO_3)_2$, or the like.

The polymerization reaction for polymerizing the olefin-based monomer may be performed by a conventional process applied to the polymerization of olefin monomers such as continuous solution polymerization, bulk polymerization, suspension polymerization, slurry polymerization, emulsion polymerization, or the like.

The polymerization reaction of olefin monomers may be performed in the presence of an inert solvent, and examples of the inert solvent include benzene, toluene, xylene, cumene, heptane, cyclohexane, methylcyclohexane, methylcyclopentane, n-hexane, 1-hexene, and 1-octene, but the present invention is not limited thereto.

The polymerization of the olefin-based polymer may be performed at about 25° C. to about 500° C., specifically 80° C. to 250° C., and more specifically 100° C. to 200° C. Also, the reaction pressure at the time of polymerization may be 1 kgf/cm² to 150 kgf/cm², preferably 1 kgf/cm² to 120 kgf/cm², and more preferably 5 kgf/cm² to 100 kgf/cm².

Due to having improved physical properties, the olefin-based polymer of the present invention may be used for blow molding, extrusion molding, or injection molding in diverse fields and uses including packaging, construction, household goods, or the like, such as a material for an automobile, a wire, a toy, a textile, a medicine, or the like. Particularly, the olefin-based polymer may be usefully used for an automobile which requires excellent impact strength.

In addition, the olefin-based polymer of the present invention may be usefully used in the production of molded articles.

The molded article may specifically be a blow molded article, an inflation molded article, a cast molded article, an extrusion laminate molded article, an extrusion molded article, a foamed molded article, an injection molded article, a sheet, a film, a fiber, a monofilament, a non-woven fabric, or the like.

EXAMPLES

Hereinafter, the present invention will be described in detail with reference to the following examples so that one of ordinary skill in the art may readily carry out the present invention. However, the present invention may be embodied in several different forms, and therefore, is not limited to embodiments described herein.

Preparation Example 1: Preparation of Transition Metal Compound (1) Preparation of 2-methyl-7-(2,3,4,5-tetramethyl-1,3-cyclopentadienyl)indoline (i) Preparation of Lithium Carbamate 2-methylindoline (13.08 g, 98.24 mmol) and diethyl ether (150 mL) were put into a Schlenk flask. The Schlenk flask was immersed in a low temperature bath set at −78° C. and formed of dry ice and acetone and stirred for 30 minutes. Subsequently, n-BuLi (39.3 mL, 2.5 M, 98.24 mmol) was added via a syringe under a nitrogen atmosphere to form a pale yellow slurry. Then, the flask was stirred for 2 hours, and then the temperature of the flask was raised to room temperature while removing the produced butane gas. The flask was immersed again in a low-temperature bath set at −78° C. to lower the temperature, and then $CO_2$ gas was input. As the carbon dioxide gas was input, the slurry disappeared and became a clear solution. The flask was connected to a bubbler to remove the carbon dioxide gas, and a temperature was raised to room temperature. Afterward, excess $CO_2$ gas and a solvent were removed under vacuum. The flask was transferred to a dry box, and pentane was added thereto, followed by vigorous stirring and filtration to obtain lithium carbamate which is a white solid compound. The white solid compound was coordinated with diethyl ether. The yield was 100%.

(ii) Preparation of 2-methyl-7-(2,3,4,5-tetramethyl-1,3-cyclopentadienyl)indoline The lithium carbamate compound prepared in Step (i) (8.47 g, 42.60 mmol) was put into a Schlenk flask. Subsequently, tetrahydrofuran (4.6 g, 63.9 mmol) and 45 mL of diethyl ether were sequentially added. The Schlenk flask was immersed in a low-temperature bath set at −20° C. and formed of acetone and a small amount of dry ice and stirred for 30 minutes, and then t-BuLi (25.1 mL, 1.7 M, 42.60 mmol) was added thereto. At this time, the color of the reaction mixture turned red. The mixture was stirred for 6 hours while the temperature was maintained at −20° C. A $CeCl_3 \cdot 2LiCl$ solution (129 mL, 0.33 M, 42.60 mmol) dissolved in tetrahydrofuran and tetramethylcyclopentinone (5.89 g, 42.60 mmol) were mixed in a syringe, and then input into the flask under a nitrogen atmosphere. The temperature of the flask was slowly raised to room temperature. After 1 hour, a thermostat was removed, and a temperature was maintained at room temperature. Subsequently, water (15 mL) was added to the flask, and ethyl acetate was added thereto, followed by filtration to obtain a filtrate. The filtrate was transferred to a separatory funnel, followed by the addition of hydrochloric acid (2 N, 80 mL) and shaking for 12 minutes. Then, a saturated aqueous solution of sodium hydrogen carbonate (160 mL) was added thereto for neutralization, and then an organic layer was extracted. Anhydrous magnesium sulfate was added to the organic layer to remove moisture, followed by filtration, and the filtrate was taken to remove the solvent. The obtained filtrate was purified by column chromatography using a hexane and ethyl acetate solvent (v/v, 10:1) to obtain an oil phase. The yield was 19%.

¹H NMR ($C_6D_6$): δ 6.97 (d, J=7.2 Hz, 1H, CH), δ 6.78 (d, J=8 Hz, 1H, CH), δ 6.67 (t, J=7.4 Hz, 1H, CH), δ 3.94 (m, 1H, quinoline-CH), δ 3.51 (br s, 1H, NH), δ 3.24-3.08 (m, 2H, quinoline-$CH_2$, Cp-CH), δ 2.65 (m, 1H, quinoline-$CH^2$), δ 1.89 (s, 3H, Cp-$CH_3$), δ 1.84 (s, 3H, Cp-$CH_3$), δ 1.82 (s, 3H, Cp-$CH_3$), δ 1.13 (d, J=6 Hz, 3H, quinoline-$CH_3$), δ 0.93 (3H, Cp-$CH_3$) ppm.

(2) Preparation of [(2-methylindoline-7-yl)tetramethylcyclopentadienyl-eta5,kapa-N]titanium dimethyl (i) Preparation of [(2-methylindoline-7-yl)tetramethylcyclopentadienyl-$\eta^5$, κ-N]di-lithium compound In a dry box, 2-methyl-7-(2,3,4,5-tetramethyl-1,3-cyclopentadienyl)-indoline (2.25 g, 8.88 mmol) prepared in Step (1) and 50 mL of diethyl ether were put into a round flask, a temperature was lowered to −30° C., and n-BuLi (4.9 g, 2.5 M, 17.8 mmol) was slowly added thereto while stirring. The reaction was allowed to proceed for 6 hours while the temperature was raised to room temperature. Afterward, a solid was obtained by filtration while washing with diethyl ether several times. A vacuum was applied to remove the remaining solvent, thereby obtaining a di-lithium compound coordinated with 0.58 equivalents of diethyl ether (1.37 g, 50%).

$^1$H NMR (Pyridine-d8): δ 7.22 (br s, 1H, CH), δ 7.18 (d, J=6 Hz, 1H, CH), δ 6.32 (t, 1H, CH), δ 4.61 (brs, 1H, CH), δ 3.54 (m, 1H, CH), δ 3.00 (m, 1H, CH), δ 2.35-2.12 (m, 13H, CH, Cp-CH3), δ 1.39 (d, indoline-CH$_3$) ppm.

(ii) Preparation of (2-methylindoline-7-yl)tetramethylcyclopentadienyl-η$^5$,κ-N]titanium dimethyl In a dry box, TiCl$_4$·DME (1.24 g, 4.44 mmol) and diethyl ether (50 mL) were put into a round flask, and MeLi (6.1 mL, 8.88 mmol, 1.4 M) was slowly added thereto while stirring at −30° C. After stirring for 15 minutes, the [(2-methylindoline-7-yl)tetramethylcyclopentadienyl-η$^5$,κ-N] di-lithium compound (1.37 g, 4.44 mmol) prepared in Step (i) was added to the flask. Stirring was performed for 3 hours while a temperature was raised to room temperature. After completion of the reaction, a vacuum was applied to remove the solvent, and the resultant was dissolved in pentane, followed by filtration to obtain a filtrate. A vacuum was applied to remove the pentane, thereby preparing a title compound.

$^1$H NMR (CEDE): δ 7.01-6.96 (m, 2H, CH), δ 6.82 (t, J=7.4 Hz, 1H, CH), δ 4.96 (m, 1H, CH), δ 2.88 (m, 1H, CH), δ 2.40 (m, 1H, CH), δ 2.02 (s, 3H, Cp-CH$_3$), δ 2.01 (s, 3H, Cp-CH$_3$), δ 1.70 (s, 3H, Cp-CH$_3$), δ 1.69 (s, 3H, Cp-CH$_3$), δ 1.65 (d, J=6.4 Hz, 3H, indoline-CH$_3$), δ 0.71 (d, J=10 Hz, 6H, TiMe$_2$-CH$_3$) ppm.

Example 1

A 1.5 L continuous reactor was charged with a hexane solvent (6 kg/h) and 1-butene (0.35 kg/h), and then the temperature at the top of the reactor was preheated to 143.5° C. A triisobutyl aluminum compound (0.03 mmol/min), the transition metal compound (0.40 μmol/min) obtained in Preparation Example 1, and a dimethylanilinium tetrakis (pentafluorophenyl) borate cocatalyst (1.20 μmol/min) were simultaneously input into the reactor. Subsequently, hydrogen gas (25 cc/min) and ethylene (0.87 kg/h) were then input into the reactor, and a copolymerization reaction was carried out at 143.5° C. for 30 minutes or more in a continuous process at a pressure of 89 bar to obtain a copolymer. After drying in a vacuum oven for 12 hours or more, the physical properties were measured.

Examples 2 to 6

Copolymers were obtained by performing a copolymerization reaction in the same manner as in Example 1 while varying usage amounts of a transition metal compound, catalyst, and cocatalyst, reaction temperature, an input amount of hydrogen, and an amount of comonomer as shown in Table 1 below.

Comparative Example 1

DF840 purchased from Mitsui Chemicals was used.

Comparative Example 2

DF810 purchased from Mitsui Chemicals was used.

TABLE 1

|  | Usage amount of catalyst (μmol/min) | Cocatalyst (μmol/min) | TiBAl (mmol/min) | Ethylene (kg/h) | Hexane (kg/h) | 1-Butene (kg/h) | Hydrogen (cc/min) | Reaction temperature (° C.) |
|---|---|---|---|---|---|---|---|---|
| Example 1 | 0.40 | 1.20 | 0.03 | 0.87 | 7 | 0.35 | 25 | 143.5 |
| Example 2 | 0.20 | 0.60 | 0.03 | 0.87 | 7 | 0.35 | 31 | 139.0 |
| Example 3 | 0.36 | 1.08 | 0.03 | 0.87 | 7 | 0.23 | 28 | 138.6 |
| Example 4 | 0.30 | 0.90 | 0.03 | 0.87 | 7 | 0.23 | 28 | 138.6 |
| Example 5 | 0.29 | 0.87 | 0.03 | 0.87 | 7 | 0.29 | 33 | 140.2 |
| Example 6 | 0.32 | 0.96 | 0.03 | 0.87 | 7 | 0.23 | 28 | 139.9 |

Experimental Example

The physical properties of the copolymers of Examples 1 to 6 and Comparative Examples 1 and 2 were evaluated, and results thereof are shown in Table 2 below.
1) Density of Polymer
Measurement was made in accordance with ASTM D-792.
2) Melt Index (MI) of Polymer
Measurement was made in accordance with ASTM D-1238 (condition E, 190° C., a load of 2.16 kg).
3) Melt Flow Rate Ratio (MFRR)
MI10 and MI2.16 were measured in accordance with ASTM D-1238 [condition E, MI10 (190° C., a load of 10 kg), MI2.16 (190° C., a load of 2.16 kg)], and then MI10 was divided by MI2.16 to calculate a melt flow rate ratio (MFRR).
4) Weight-Average Molecular Weight (Mw, g/Mol) and Molecular Weight Distribution (MWD)
The number-average molecular weight (Mn) and weight-average molecular weight (Mw) were measured by gel permeation chromatography (GPC), and the molecular weight distribution was calculated by dividing the weight average molecular weight by the number average molecular weight.
Column: PL Olexis
Solvent: Trichlorobenzene (TCB)
Flow rate: 1.0 ml/min
Concentration of sample: 1.0 mg/ml
Injection amount: 200 μl
Column temperature: 160° C.
Detector: Agilent High Temperature RI detector
Standard: Polystyrene (Calibration using cubic function)

5) Melting Point (Tm) and Glass Transition Temperature (Tg)

The melting point (Tm) and glass transition temperature (Tg) were obtained using a differential scanning calorimeter (DSC: Differential Scanning calorimeter 250 manufactured by TA instruments). That is, a DSC curve was observed while a temperature was raised to 150° C., maintained for 1 minute, then lowered to −100° C., and raised again.

6) T(90), T(50), dH(100), and dH(90)

T(90), T(50), dH(100), and dH(90) were obtained by a successive self-nucleation/annealing (SSA) measurement method using a DSC (Differential Scanning calorimeter 250 manufactured by TA instruments).

Specifically, in the first cycle, a temperature was raised to 150° C., maintained for 1 minute, and then lowered to −100° C. In the second cycle, a temperature was raised to 120° C., maintained for 30 minutes, and then lowered to −100° C. In the third cycle, a temperature was raised to 110° C., maintained for 30 minutes, and then lowered to −100° C. In this way, the process of raising a temperature at an interval of 10° C. and lowering the temperature to −100° C. was repeated until −60° C. was reached so that crystallization was made for each temperature section. In this case, the ascending and descending rates of temperature were adjusted to 10° C./min.

In the last cycle, heat capacity was measured while raising the temperature to 150° C.

The obtained temperature-heat capacity curve was integrated for each section to fractionate the heat capacity of each section relative to the total heat capacity. Here, a temperature at which 50% was melted with respect to the total heat capacity was referred to as T(50), and a temperature at which 90% was melted with respect to the total heat capacity was referred to as T(90).

In addition, in the SSA measurement, the sum (ΔH) of the enthalpy of fusion at 90° C. or more was referred to as dH(90), and the sum (ΔH) of the enthalpy of fusion at 100° C. or more was referred to as dH(100).

Figure 1:
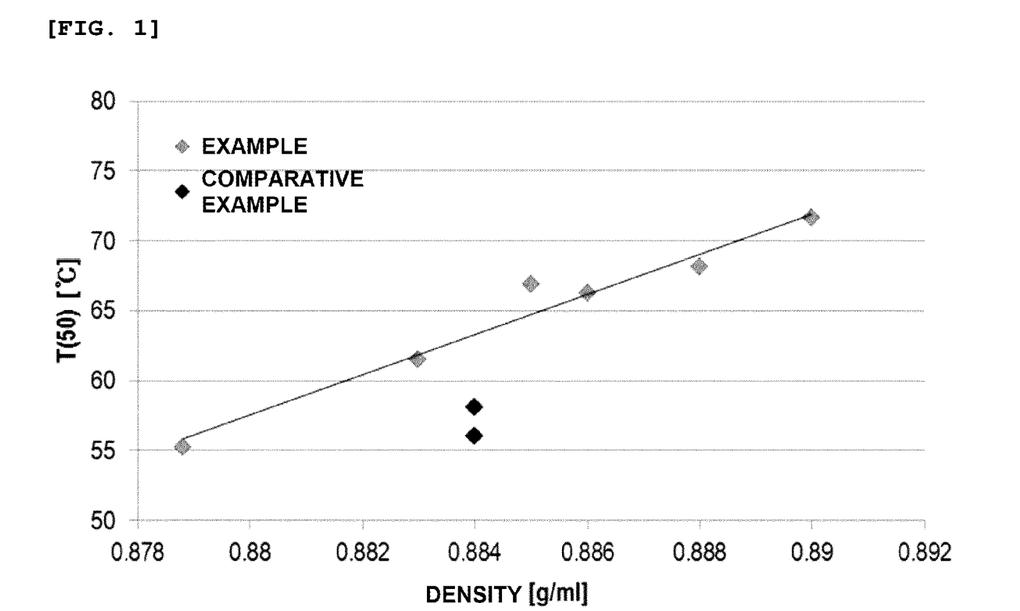
FIG. 1 shows a graph illustrating T(50) relative to the density of the polymers of Examples 1 to 6 and Comparative Examples 1 and 2.
Figure 2:
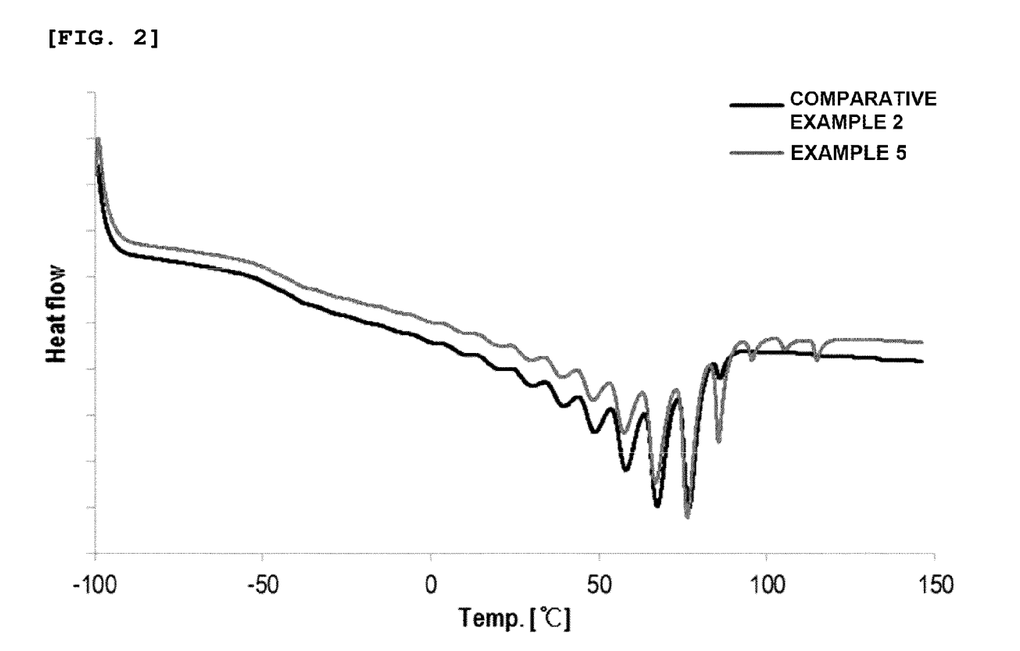
FIG. 2 shows a graph illustrating a result of measuring the polymers of Example 5 and Comparative Example 2 by successive self-nucleation/annealing (SSA) using a differential scanning calorimeter.

FIG. 1 shows a graph illustrating T(50) relative to the density of the polymers of Examples 1 to 6 and Comparative Examples 1 and 2, and FIG. 2 shows a graph illustrating a result of measuring the polymers of Example 5 and Comparative Example 2 by successive self-nucleation/annealing (SSA) using a differential scanning calorimeter.

7) Tensile Strength and Elongation Rate of Polymer

Each of the olefin-based copolymers of Example 5 and Comparative Example 2 was extruded to prepare a pellet, and the elongation rate and tensile strength at break thereof were measured in accordance with ASTM D638 (50 mm/min).

8) Flexural Modulus

Flexural modulus was measured in accordance with ASTM D790 using INSTRON 3365 equipment.

9) Hardness (Shore A)

Hardness was measured in accordance with ASTM D2240 using GC610 STAND for Durometer (Teclock Corporation) and a Type A-shore hardness tester (Mitutoyo Chemical Co., Ltd.).

TABLE 2

| | Density (g/mL) | MI (g/10 min) | MFRR | Tg (° C.) | Mw (g/mol) | MWD | Tm (° C.) | SSA T(50) | SSA T(90) | SSA T(90) − T(50) | dH(100) (J/g) | dH(90) (J/g) |
|---|---|---|---|---|---|---|---|---|---|---|---|---|
| Example 1 | 0.8788 | 1.95 | 7.1 | −500.8 | 94021 | 2.17 | 61.7 | 55.2 | 80.1 | 24.9 | 0.96 | 1.62 |
| Example 2 | 0.8880 | 3.21 | 6.48 | −44.8 | 86057 | 2.10 | 71.1 | 68.1 | 90.1 | 22.0 | 1.82 | 4.25 |
| Example 3 | 0.8830 | 1.61 | 7.01 | −47.3 | 98857 | 2.16 | 67.4 | 61.5 | 84.8 | 23.3 | 1.28 | 2.29 |
| Example 4 | 0.8860 | 1.69 | 6.62 | −44.9 | 100370 | 1.96 | 70.4 | 66.2 | 88.4 | 22.2 | 1.35 | 2.64 |
| Example 5 | 0.8850 | 1.16 | 6.53 | −43.1 | 108628 | 2.03 | 70.6 | 66.9 | 84.4 | 17.5 | 0.98 | 1.63 |
| Example 6 | 0.8900 | 0.72 | 7.46 | −43.1 | 117140 | 1.98 | 74.4 | 71.6 | 90.2 | 18.6 | 1.26 | 2.39 |
| Comparative Example 1 | 0.8840 | 3.44 | 6.31 | −42.9 | 83425 | 1.93 | 70.9 | 56.0 | 76.7 | 20.7 | 0 | 0 |
| Comparative Example 2 | 0.8840 | 1.18 | 6.51 | −43.3 | 114216 | 1.90 | 69.3 | 58.1 | 77.8 | 19.7 | 0 | 0 |

TABLE 3

| | Density (g/mL) | MI (g/10 min) | Tensile strength (MPa) | Flexural modulus (MPa) | Elongation rate (%) | Hardness (Shore A) |
|---|---|---|---|---|---|---|
| Example 2 | 0.888 | 3.21 | 18.1 | 34.26 | >700 | 92.9 |
| Comparative Example 1 | 0.884 | 3.44 | 15.0 | 27.91 | >700 | 85.3 |
| Example 5 | 0.885 | 1.16 | 26.8 | 36.98 | >700 | 88.2 |
| Comparative Example 2 | 0.884 | 1.18 | 25.1 | 30.37 | >700 | 85.8 |

Referring to Table 2, when examples and comparative examples, which had equivalent levels of density and MI, were compared, Examples 2 and 5 exhibited lower T(90)−T(50) values than Comparative Examples 1 and 2. Particularly, the olefin-based polymers of Examples 2 and 5 satisfied 0.5 J/g≤dH(100)≤3.0 J/g and 1.0 J/g≤dH(90)≤6.0 J/g, but the olefin-based polymer of Comparative Example 2 did not satisfy dH(100) and dH(90) requirements because both of dH(100) and dH(90) values were 0. Referring to Table 3, Example 5 and Comparative Example 2, which had equivalent levels of density and MI, could be compared. In the case of Examples 2 and 5, it can be confirmed that a polymer crystalline region melted at a high temperature was introduced to increase mechanical stiffness, and thus tensile strength, flexural modulus, and hardness were increased compared to Comparative Example 2.

Meanwhile, FIG. 1 shows a graph illustrating T(50) relative to the density of the olefin-based polymers of Examples 1 to 6 and Comparative Examples 1 and 2, and FIG. 2 shows a graph illustrating a result of measuring the polymers of Example 5 and Comparative Example 2 by successive self-nucleation/annealing (SSA) using a differential scanning calorimeter.

Referring to FIG. 1, in the case of the olefin-based polymers of Examples 1 to 6, it can be confirmed that as density was increased, T(50) was increased, and thus density and T(50) had a linear correlation. On the other hand, in the case of the olefin-based polymers of Comparative Examples 1 and 2, density and T(50) did not have a specific correlation. Meanwhile, referring to FIG. 2, it can be confirmed that the olefin-based polymer of Example 5 was eluted at a relatively high temperature compared to the olefin-based polymer of Comparative Example 2. From these results, it can be seen that the olefin-based polymer of Example 5 has a highly crystalline region introduced therein, and the introduction of a highly crystalline region results in the high tensile strength and hardness of the polymer.

As described above, the olefin-based polymers of Examples 1 to 6 are polymers obtained by polymerizing olefin-based monomers while inputting hydrogen gas, satisfy $0.5\ J/g \leq dH(100) \leq 3.0\ J/g$ and $1.0\ J/g \leq dH(90) \leq 6.0\ J/g$ as measured by SSA using a DSC, and exhibit high mechanical stiffness.

The invention claimed is:

1. An olefin-based polymer satisfying the following requirements (1) to (5):
   (1) a melt index (MI, 190° C. and 2.16 kg load conditions) ranging from 0.1 to 10.0 g/10 min;
   (2) a density (d) ranging from 0.875 to 0.895 g/cc;
   (3) $0.5\ J/g \leq dH(100) \leq 3.0\ J/g$ and $1.0\ J/g \leq dH(90) \leq 6.0\ J/g$ as measured by successive self-nucleation/annealing (SSA) using a differential scanning calorimeter (DSC);
   (4) $15°\ C. \leq T(90)-T(50) \leq 30°\ C.$ and $50°\ C. \leq T(50) \leq 75°\ C.$ as measured by successive self-nucleation/annealing (SSA) using a differential scanning calorimeter (DSC); and
   (5) a melting point (Tm) of $55°\ C. \leq Tm \leq 80°\ C.$ as measured using a differential scanning calorimeter (DSC),
   wherein the T(50) and T(90) represent temperatures at which 50% and 90% are melted with respect to the total heat capacity, respectively, when the heat capacity of each section is fractionated relative to the total heat capacity by integrating a temperature-heat capacity curve for each section in the result of SSA measurement using a differential scanning calorimeter (DSC), dH(90) represents the sum of the enthalpy of fusion at 90° C. or more, and dH(100) represents the sum of the enthalpy of fusion at 100° C. or more.

2. The olefin-based polymer of claim 1, further satisfying a requirement (6): a glass transition temperature (Tg) of $-70°\ C. \leq Tg \leq -43°\ C.$ as measured using a differential scanning calorimeter (DSC).

3. The olefin-based polymer of claim 1, further satisfying a requirement (7): a weight-average molecular weight (Mw) ranging from 10,000 g/mol to 500,000 g/mol.

4. The olefin-based polymer of claim 1, further satisfying a requirement (8): a molecular weight distribution (MWD) ranging from 0.1 to 6.0.

5. The olefin-based polymer of claim 1, further satisfying a requirement (9): a melt flow rate ratio (MFRR) ranging from 5 to 10.

6. The olefin-based polymer of claim 1, wherein the melt index (MI) of the olefin-based polymer ranges from 0.3 g/10 min to 9 g/10 min.

7. The olefin-based polymer of claim 1, wherein the T(90) and T(50) satisfy $16°\ C. \leq T(90)-T(50) \leq 25°\ C.$, and $52°\ C. \leq T(50) \leq 74°\ C.$ 8. The olefin-based polymer of claim 1, wherein the dH(100) and dH(90) satisfy $0.9\ J/g \leq dH(100) \leq 2.0\ J/g$ and $1.5\ J/g \leq dH(90) \leq 5.0\ J/g$.

9. The olefin-based polymer of claim 1, wherein the melting point (Tm) satisfies $60°\ C. \leq Tm \leq 80°\ C.$ 10. The olefin-based polymer of claim 1, wherein the olefin-based polymer is a copolymer of ethylene and a C3 to C12 α-olefin comonomer.

11. The olefin-based polymer of claim 10, wherein the α-olefin comonomer includes any one or a mixture of two or more selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbornene, phenyl norbornene, vinyl norbornene, dicyclopentadiene, 1,4-butadiene, 1,5-pentadiene, 1,6-hexadiene, styrene, α-methylstyrene, divinylbenzene, and 3-chloromethyl styrene.

12. The olefin-based polymer of claim 1, wherein the olefin-based polymer is a copolymer of ethylene and 1-butene.

13. The olefin-based polymer of claim 1, wherein the olefin-based polymer is obtained by a preparation method including polymerizing olefin-based monomers while inputting hydrogen gas in the presence of a catalyst composition for olefin polymerization including a transition metal compound represented by the following Chemical Formula 1:

[Chemical Formula 1]

in Chemical Formula 1, $R_1$ is the same as or different from each other and each independently represents hydrogen, a C1 to C20 alkyl, a C2 to C20 alkenyl, aryl, silyl, alkylaryl, arylalkyl, or a metalloid radical of a Group 4 metal substituted with a hydrocarbyl, and the two $R_1$ are optionally connected to each other by an alkylidine radical including a C1 to C20 alkyl or a C6 to C20 aryl radical to form a ring;

$R_2$ is the same as or different from each other and each independently represents hydrogen; a halogen; a C1 to C20 alkyl; aryl; alkoxy; aryl oxy; or an amido radical, and two or more of $R_2$ are optionally connected to each other to form an aliphatic ring or an aromatic ring;

$R_3$ is the same as or different from each other and each independently represents hydrogen; a halogen; a C1 to C20 alkyl; or an aryl radical-substituted or unsubstituted nitrogen-containing aliphatic or aromatic ring, and when there are a plurality of the substituents, two or more substituents are optionally connected to each other to form an aliphatic ring or an aromatic ring;

M is a Group 4 transition metal; and $Q_1$ and $Q_2$ each independently represent a halogen; a C1 to C20 alkyl; alkenyl; aryl; alkylaryl; arylalkyl; a C1 to C20 alkyl amido; or aryl amido.

14. The olefin-based polymer of claim 13, wherein an input amount of the hydrogen gas ranges from 20 to 40 sccm.

15. The olefin-based polymer of claim 13, wherein the olefin-based polymer is prepared by a continuous solution polymerization reaction using a continuous stirred tank reactor while inputting hydrogen in the presence of the catalyst composition for olefin polymerization.

16. The olefin-based polymer of claim 13, wherein the transition metal compound represented by Chemical Formula 1 is a compound represented by the following Chemical Formula 1-1:

\* \* \* \* \*